US008643507B2

(12) United States Patent
Rodriguez et al.

(10) Patent No.: US 8,643,507 B2
(45) Date of Patent: Feb. 4, 2014

(54) VEHICLE-BASED THREAT DETECTION SYSTEM

(75) Inventors: Gary J. Rodriguez, Parker, CO (US); William A. Good, Highlands Ranch, CO (US); Edward J. Britt, Cupertino, CA (US); David C. Loda, Bolton, CT (US)

(73) Assignees: Gary G. Rodriguez, Parker, CO (US); William A. Good, Highlands Ranch, CO (US); Edward J. Britt, Cupertino, CA (US); David C. Loda, Bolton, CT (US)

( * ) Notice: Subject to any disclaimer, the term of this patent is extended or adjusted under 35 U.S.C. 154(b) by 988 days.

(21) Appl. No.: 12/085,862

(22) PCT Filed: Mar. 28, 2006

(86) PCT No.: PCT/US2006/011492
§ 371 (c)(1),
(2), (4) Date: Dec. 2, 2009

(87) PCT Pub. No.: WO2007/055720
PCT Pub. Date: May 18, 2007

(65) Prior Publication Data
US 2010/0277345 A1     Nov. 4, 2010

Related U.S. Application Data

(60) Provisional application No. 60/665,723, filed on Mar. 28, 2005.

(51) Int. Cl.
*G08B 21/00*     (2006.01)
(52) U.S. Cl.
USPC .......................................... 340/945; 340/963

(58) Field of Classification Search
None
See application file for complete search history.

(56) References Cited

U.S. PATENT DOCUMENTS

| | | | |
|---|---|---|---|
| 3,146,349 A | 8/1964 | Jordan | |
| 4,509,042 A * | 4/1985 | Kruse | 340/600 |
| 4,866,439 A * | 9/1989 | Kraus | 340/945 |
| 5,086,300 A | 2/1992 | Ashmore | |
| 5,732,074 A | 3/1998 | Spaur et al. | |
| 6,246,320 B1 | 6/2001 | Monroe | |
| 6,392,692 B1 | 5/2002 | Monroe | |
| 6,438,468 B1 | 8/2002 | Muxlow et al. | |
| 6,469,624 B1 | 10/2002 | Whan et al. | |
| 6,610,977 B2 | 8/2003 | Megerle | |
| 6,738,012 B1 | 5/2004 | Kirkpatrick | |
| 6,775,348 B2 | 8/2004 | Hoffman | |

(Continued)

FOREIGN PATENT DOCUMENTS

| | | |
|---|---|---|
| GB | 2 404 431 A | 2/2005 |
| WO | 2006125014 A2 | 11/2006 |

OTHER PUBLICATIONS

Eberhardt et al. Fast neutron radiography scanner for the detection of contraband in air cargo containers, Applied Radiation and Isotopes, 63 (2005) 179-188, 2005.

*Primary Examiner* — Travis Hunnings
(74) *Attorney, Agent, or Firm* — Kinney & Lange, P.A.

(57) ABSTRACT

A vehicle-based threat detection system (10) for detecting weapons in a vehicle includes at least one sensor (12) in a cargo holding area of the vehicle. The sensor (12) is connected to at least one detector (14) that detects presence of a weapon in the cargo holding area. A warning system (16) is capable of communicating detection of a weapon to a location remote from the cargo holding area.

24 Claims, 3 Drawing Sheets

(56) References Cited

U.S. PATENT DOCUMENTS

| | | |
|---|---|---|
| 6,891,470 B2 | 5/2005 | Bohinc, Jr. |
| 6,937,692 B2 | 8/2005 | Johnson et al. |
| 6,952,163 B2 | 10/2005 | Huey et al. |
| 6,954,145 B2 | 10/2005 | Nakamura et al. |
| 6,965,816 B2 | 11/2005 | Walker |
| 6,980,151 B1 | 12/2005 | Mohan |
| 7,167,788 B2 | 1/2007 | Loda et al. |
| 7,246,003 B2 | 7/2007 | Loda et al. |
| 7,251,554 B2 | 7/2007 | Loda et al. |
| 2003/0105565 A1 | 6/2003 | Loda et al. |
| 2003/0163591 A1 | 8/2003 | Loda |
| 2004/0073808 A1* | 4/2004 | Smith et al. .................. 713/200 |
| 2004/0206818 A1* | 10/2004 | Loda et al. .................... 235/424 |
| 2005/0008119 A1 | 1/2005 | McClelland et al. |
| 2005/0023477 A1 | 2/2005 | Archer et al. |
| 2005/0027826 A1 | 2/2005 | Loda et al. |
| 2005/0064922 A1 | 3/2005 | Owens et al. |
| 2005/0165534 A1 | 7/2005 | Loda et al. |
| 2005/0275545 A1* | 12/2005 | Alioto et al. .................. 340/600 |
| 2006/0015777 A1 | 1/2006 | Loda |
| 2006/0164239 A1 | 7/2006 | Loda |
| 2006/0168090 A1 | 7/2006 | Loda et al. |

\* cited by examiner

VEHICLE-BASED THREAT DETECTION SYSTEM

BACKGROUND OF THE INVENTION

The present invention relates generally to a weapon detection system. More specifically, the present invention relates to a vehicle-based threat detection system for detecting weapons of mass destruction being loaded onto a vehicle.

Despite enhanced security efforts following the terrorist attacks on the United States on Sep. 11, 2001, the majority of air cargo is still not scanned for explosives or other types of weapons. Passengers, along with their luggage, are scanned before boarding an airplane; but, air cargo typically is not. A major concern is that cargo being shipped from a foreign country is under the control of local personnel until after it is loaded onto the aircraft. If cargo is not inspected until after it has reached its destination, there is an opportunity for a weapon to be detonated by an automatic system when the aircraft is en route or as the aircraft approaches its landing at a population center. To date, little acknowledgment has been given to the very real possibility that terrorists could transport a weapon of mass destruction (WMD) into a country onboard an aircraft.

The main impediment to implementing an air cargo screening system is cost. An additional concern is that air cargo screening would slow down the shipping business, which may negatively impact the economy. Furthermore, if an air cargo screening system were to be implemented, it is important that such a system be designed to ensure against corruption by local personnel, regardless of whether it is domestic or foreign personnel.

A ground-based system for screening cargo, similar to those systems currently in place for screening passengers and their luggage, would be ineffective and impractical. To begin with, a ground-based system that scans cargo before it is loaded onto an aircraft would still be under the control of local personnel. Thus, there is an opportunity for local personnel to insert a weapon amongst the cargo loaded onto the aircraft, or for local personnel to be influenced into allowing a weapon to be loaded onto the aircraft.

A ground-based cargo screening system is impractical because it would be extremely expensive, and would be enormous in size. Explosive detection systems for checked passenger luggage cost billions of dollars to implement, and those systems are not large enough to scan cargo-sized parcels. The costs of creating explosive detection systems that would be large enough to scan cargo are unimaginable.

Although the threat of attack has been described above in reference to weapons being loaded as cargo onto an aircraft, weapons could similarly be loaded onto other types of transport vehicles, including marine vehicles and land vehicles.

There is a need for a threat detection system that is economically feasible, tamper-proof, and capable of detecting virtually any type of weapon before it reaches its intended detonation or destination point.

BRIEF SUMMARY OF THE INVENTION

The present invention relates to a vehicle-based threat detection system for detecting weapons in a vehicle. The threat detection system includes at least one sensor in a cargo holding area of the vehicle, at least one detector connected to the sensor to detect presence of a weapon in the cargo holding area, and a warning system capable of communicating detection of a weapon to a location remote from the cargo holding area.

DETAILED DESCRIPTION

Figure 1:
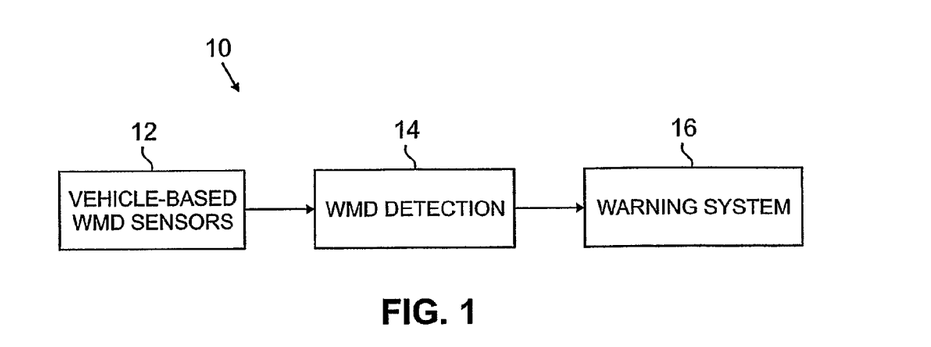
FIG. 1 is a block diagram of a vehicle-based threat detection system of the present invention.

FIG. 1 is a block diagram representing the major components of vehicle-based threat detection system 10 for scanning and monitoring cargo being loaded onto a vehicle. Threat detection system 10 includes vehicle-based WMD sensors 12, WMD detection unit 14, and warning system 16. As discussed in more detail below, the present invention relates to mounting sensors 12 on or inside the vehicle. The vehicle itself serves as the large machine that is used to screen the cargo. Thus the vehicle-based system of the present invention eliminates the need to have enormous scanning equipment, similar to that currently used for passenger luggage but with the capability of scanning substantially larger parcels. Because sensors 12 are mounted on or inside the vehicle, threat detection system 10 screens the cargo as it is being loaded onto the vehicle. Thus, system 10 does not add to the total handling time required before the cargo may be loaded onto the vehicle, in contrast to a ground-based system which requires an additional step of scanning the cargo before it is loaded.

Sensors 12 may include any type of sensor used for detecting any type of weapon or explosive, particularly WMDs. A weapon of mass destruction (WMD) is broadly defined herein as any weapon (nuclear, radiological, biological or chemical) that is capable of killing a large number of people. Sensors 12 may include, but are not limited to, radiation sensors having gamma ray detectors and neutron counters, sensors for detecting chemical agents (typically air sampling sensors), sensors for detecting biological agents (also typically air sampling sensors), and sensors for detecting explosives used to disperse radiological, chemical or biological weapons. Sensors 12 include sensors for detecting "dirty bombs", which typically are radiological weapons having a conventional explosive and configured to disperse radioactive materials. Sensors 12 may also include hand held sensors that could be carried by a user to physically scan items inside the vehicle once presence of a weapon has been identified by detection unit 14. Sensors 12 may also include sensors capable of detecting illegal drugs. The radiation sensors described above are typically passive sensors, but it is recognized that sensors 12 could include active sensors.

WMD detection unit 14 is connected to sensors 12 and analyzes data from sensors 12 to determine whether a weapon is detected, and if so, a type of weapon detected. Detection unit 14 may be a read out unit that provides visual and/or audio output communicating whether a particular weapon has been detected. For example, detection unit 14 could include three sets of green and red lights designated for nuclear, chemical and biological weapons. In other embodiments, detection unit 14 may be computer software connected to sensors 12 that is part of a larger network system. Warning system 16 may be part of detection unit 14 or may be an independent unit of threat detection system 10. At a minimum, warning system 16 may be the visual or audio output from detection unit 14. In that case, detection unit 14 may preferably be located in an area where a controller of the vehicle resides. For example, if threat detection system 10 were installed in an aircraft, detection unit 14, which includes warning system 16, may be located in a cockpit of the aircraft where a pilot is located. Warning system 16 may also be located in a same general area as sensors 12, in addition to, or as an alternative to having a warning system in the cockpit area of the aircraft. For example, if a weapon was detected in a cargo loading area of an aircraft, warning system 16 may communicate, via an audio alarm in the cargo loading area, that a weapon was detected in that vicinity.

Warning system 16 may also include a communication to one or more locations remote from the vehicle. For example, warning system 16 could communicate a threat to a remote location via satellite or radio. A warning to a remote location may be particularly important when the vehicle is located in a hostile environment. In the event that a controller of the vehicle has been compromised or influenced, an independent warning to a remote location ensures a response to the potential threat can still be made.

In a preferred embodiment, warning system 16 may be part of a network that is capable of communicating through a wireless system, as described in more detail below in reference to FIG. 4.

Figure 2:
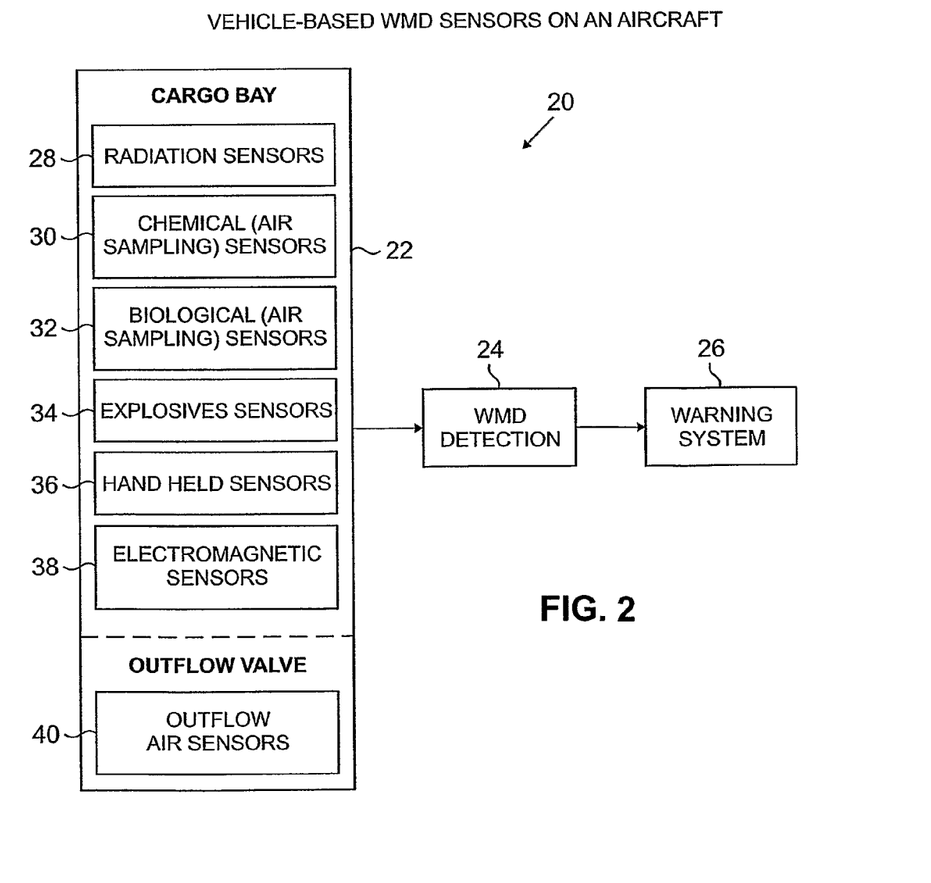
FIG. 2 is a block diagram of a threat detection system installed on an aircraft.
Figure 3:
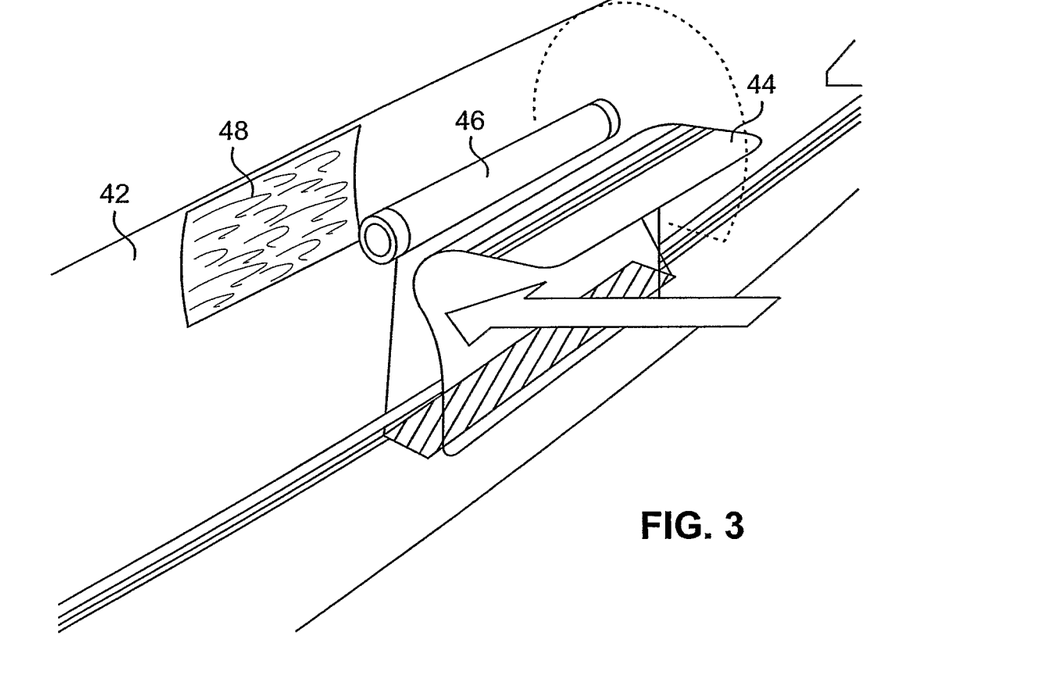
FIG. 3 is a schematic of a cargo area of an aircraft showing sensors of the threat detection system of FIG. 2 installed into the cargo area.
Figure 4:
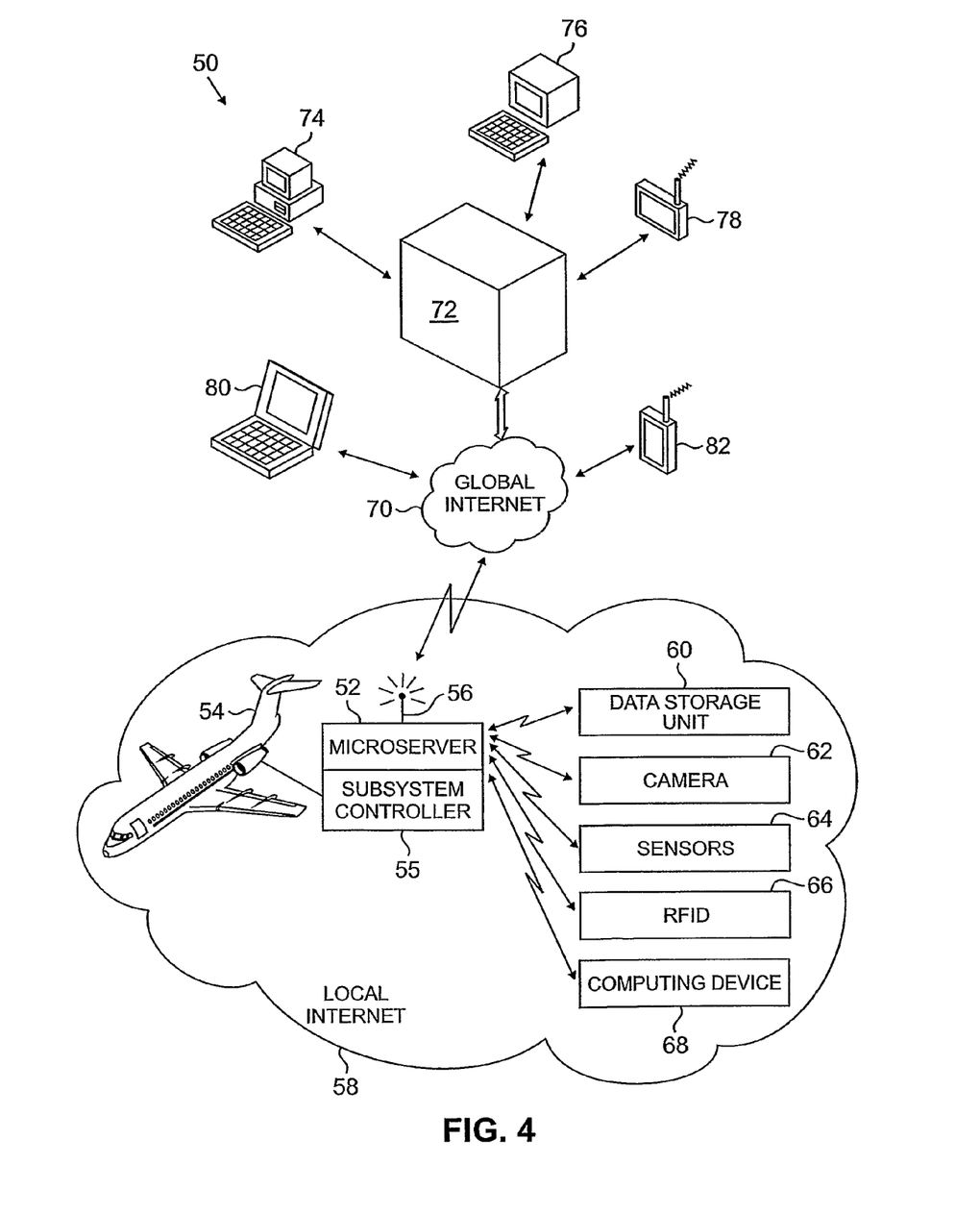
FIG. 4 is a schematic of an embodiment of the threat detection system integrated with a microserver system on an aircraft.

FIGS. 2-4 describe embodiments of a threat detection system installed on a cargo aircraft. However, it is recognized that the threat detection system of the present invention could be used for any type of vehicle, including, but not limited to, all types of aircraft (including passenger planes), marine vehicles and land vehicles, such as trucks and railcars.

FIG. 2 is a block diagram representing the major components of threat detection system 20 for scanning and monitoring cargo being loaded onto an aircraft. Threat detection system 20 includes vehicle-based WMD sensors 22, WMD detection unit 24, and warning system 26, similar to threat detection system 10 described above in reference to FIG. 1.

In one embodiment, as shown in FIG. 2, sensors 22 may include radiation sensors 28, chemical air sampling sensors 30, biological air sampling sensors 32, and explosives sensors 34, all of which are located in a cargo bay area of the aircraft. Radiation sensors 28 may preferably sense both neutrons and gamma rays in order to detect nuclear weapons, including dirty bombs. Sensors 22 also may include hand held sensors 36. If an output were communicated by warning system 16 that a weapon has been detected by detection unit 24, hand held sensors 36 may be used to individually survey each crate or pallet to determine a location of the detected weapon. Hand held sensors 36 are particularly well-suited for the detection of nuclear weapons.

As shown in FIG. 2, sensors 22 may also include electromagnetic sensors 38 in a cargo bay area of the aircraft. Electromagnetic sensors 38 may include a large antenna directed toward a focused area that cargo passes through. Such an antenna is configured to detect operating electronic devices, including computers, cell phones, watches and digital clocks, which all emit electromagnetic signals. These types of electronic devices may be configured to detonate or disperse a weapon. Thus, electromagnetic sensors 38 may be used to detect such electronic devices and alert personnel that cargo containing such devices should be further inspected.

Sensors 22 may also include outflow air sensors 40 mounted on an outflow valve of the aircraft to sample air enclosed inside the aircraft once the cargo door has been closed. Outflow air sensors 40 may include sensors for detecting chemical and biological agents within the cargo area of the aircraft, as well as sensors for detecting explosives.

Depending on the combination of sensors 22 used in threat detection system 20, detection unit 24 may consist of more than one detection unit or analyzer. As explained above in reference to FIG. 1, warning system 26 preferably sends a warning to both a controller located on the aircraft (i.e. to a pilot) and a location remote from the aircraft. Threat detection system 20 may preferably be configured to recognize if there has been any tampering with any of sensors 22. By configuring warning system 26 to also communicate with a remote location, even if the flight crew and ground support of the aircraft are compromised, threat detection system 20 may still communicate a potential threat to other locations that are capable of responding to the threat.

FIG. 3 is a schematic of cargo area 42 of an aircraft with side door 44 in an open position. In this embodiment, sensor unit 46 is mounted above door 44, spanning the full width of door 44. As shown in FIG. 3, sensor unit 46 may be a cylindrical unit containing a gamma ray scintillator and neutron counters. Cargo pallets (not shown) may pass through door 44 on a conveyor (also not shown). As indicated by an arrow in FIG. 3, the pallets pass through door 44 and sensor unit 46 scans the pallets for nuclear weapons. More specifically, sensor unit 46 screens for both gamma rays and neutrons.

With the embodiment shown in FIG. 3, sensor unit 46, having a gamma ray scintillator and neutron counters, may reliably detect much less than a critical mass of either highly enriched uranium (HEU) or plutonium-239 ($^{239}$Pu), either of which may be used in making a nuclear weapon. Sensor unit 46 may also be capable of detecting radiation typical of a radiological weapon or "dirty bomb". Existing radiation detection systems sold by several manufacturers have gamma ray scintillators and neutron counters that are similar to the components described above for sensor unit 46. Also shown in FIG. 3 is a curtain of fiber optic scintillators 48 that could be used in addition to, or as an alternative to, sensor unit 46 to scan the cargo for nuclear or radiological weapons as the pallets pass by curtain 48.

Typically, a cargo aircraft has more than one cargo loading door. Similar sensors to what are described and shown above for side door 44 could be similarly configured for each loading door of an aircraft.

Although the focus of this invention is on detecting weapons which may be loaded into cargo areas, it is recognized that it is possible to hide a weapon in other places, such as landing gear bays. A vehicle-based threat detection system as described in this invention may also include sensors located in additional zones of an aircraft where a weapon might be concealed, including, but not limited to, landing gear bays, maintenance panels, and luggage compartments. Any of the types of WMD sensors described above may be placed in these locations. Alternatively, these additional zones may be equipped with sensors that, instead of sensing for WMDs, monitor for unauthorized entry or tampering. A warning system similar to those described above in reference to FIGS. 1 and 2 may include a communication to the cockpit and/or to remote locations that these zones should be manually inspected if entry or tampering is sensed.

With any type of security screening system, it is important that the system be designed to avoid or minimize false alarms. If a security screening system generates too many false alarms, personnel will either be reluctant to use the screening system or will start to ignore alarms from the system. In regard specifically to radiation sensors, a certain amount of "normal" alarms are caused by radioactivity in particular types of cargo or isotopes within human bodies that are near the cargo door. Radiation sensors vary widely in terms of their sophistication and sensitivity. Some radiation sensors simply detect activity levels and communicate those activity levels to a read out unit or analyzer; other detector systems have the capability to determine the source of the activity and differentiate whether the registered activity is "normal" or not. It is recognized that a variety of radiation sensors are within the scope of the present invention. It is also recognized that in preferred embodiments the sensors would have minimum false alarms.

Although not shown in FIG. 3, cargo area 42 may include air sampling sensors that operate during the cargo loading process, as well as after door 44 is closed (along with any other loading doors). Air sampling sensors, like chemical air sampling sensors 30, biological air sensing sensors 32, and explosives sensors 34 (all shown in FIG. 2), may be mounted inside cargo area 42. For example, air sampling sensors may be mounted on a ceiling of cargo area 42 or on inside walls of cargo area 42. Such air sampling sensors function to monitor air enclosed inside cargo area 42 after the cargo doors have been closed.

FIG. 4 is a preferred embodiment for a threat detection system of the present invention. In this embodiment, the threat detection system is part of a wireless network system for an aircraft. Although the wireless network system is described with specific reference to an aircraft, it is recognized that this type of network system could be installed in any vehicle.

FIG. 4 shows network system 50 including onboard microserver 52, which is installed on aircraft 54. A similar network system and corresponding microserver are described in the following published applications, which are incorporated by reference in their entireties: U.S. Patent Application Pub. No. US 2003/0105565; U.S. Patent Application Pub. No. US 2003/0163591; U.S. Patent Application Pub. No. US 2004/0206818; U.S. Patent Application Pub. No. US 2005/0027826; U.S. Patent Application Pub. No. US 2005/0165534; U.S. Patent Application Pub. No. US 2005/0171651; and U.S. Patent Application Pub. No. US 2006/0015777.

Onboard microserver 52 creates a network centric aircraft maintenance and management architecture that is configured and reconfigurable to perform many applications and roles for aircraft 54. Such applications include hosting technical information and work instructions onboard the aircraft subsystem, tracking RFID (radio frequency identification) tagged parts for maintenance, tracking cargo modules for bagging using RFID, and other operational requirements. The open architecture system created by onboard microserver 52 allows for mass customization to convert various forms of data into usable knowledge without having to install or create new pieces of hardware for each application. Communication to and from microserver 52 may be through a wired or wireless connection, through satellite, cellular phones, wireless local area networks (WLAN), radio, cable or any other communication means.

As shown in FIG. 4, onboard microserver 52 is connected to aircraft 54 by subsystem controller 55, and has two-way communication with controller 55. Subsystem controller 55 may be mounted to an engine of aircraft 54 or to another component of aircraft 54, such as an auxiliary power unit or environmental control system. As also shown in FIG. 4, microserver 52 having antenna 56 generates a wireless system 58 (i.e. a local Internet) around aircraft 54. This makes it possible to have two-way wireless communication between aircraft 54 and an onboard computing device through the local Internet. Through microserver 52, it is also possible to have two-way wireless communication with a remote computing device through global Internet 70, as shown in FIG. 4. In the context of a threat detection system, onboard microserver 52 makes it possible to send a warning of a potential threat to any number of different locations, either through the local Internet (wireless system 58) and/or through the global Internet 70.

Microserver 52 may be installed in the cabin of the aircraft using existing test ports already wired into the engine/airframe. Microserver 52 may be used to host its own web page that is dedicated to aircraft 54; as a result, microserver 52 may then act as the data gateway to any component of aircraft 54 that is connected to microserver 52. Although not required, each of those components of aircraft 54 may have its own server that is similar to microserver 52. As a result, those servers may have their own corresponding web pages. For example, each engine (not shown) on aircraft 54 could have a server mounted on the engine and a corresponding web page specific to each engine.

Microserver 52, as shown in FIG. 4, may be connected to data storage unit 60, camera 62, sensors 64, RFID (radio frequency identification) 66, and computing device 68. Sensors 64 may include any type of WMD sensor described above. Because microserver 52 creates a network centric open architecture to aircraft 54, vehicle-based WMD sensors may easily be implemented into network system 50 of FIG. 4, as explained in more detail below. As shown in FIG. 4, the various components that are connected to microserver 52 (data storage unit 60, camera 62, sensors 64, RFID 66, and computing device 68) have a two-way arrow between each component and microserver 52, indicating a two-way wireless connection. However, it is recognized that any of these components may have a wired connection to microserver 52. It is also recognized that additional components from those shown in FIG. 4 may easily be connected to microserver 52.

Microserver 52 includes antenna 56, which creates a hotspot around aircraft 54. Any user on aircraft 54 can login locally to microserver 52 through the local Internet using any type of computing device 66. Users at a remote location may access microserver 52 remotely using the web page address dedicated to aircraft 54.

Remote access to microserver 52 is possible due to two-way wireless communication between wireless system 58 and global Internet 70. Portal 72, as shown in FIG. 4, may access data from microserver 52 through global Internet 70. Portal 72 functions as a central server that limits access to certain users. Data gathered by microserver 52 may be downloaded to portal 72 as desired. For example, microserver 52 may be programmed to periodically download data to a server hosting portal 72 or to download data on specific events, such as when aircraft 54 lands. As another example, microserver 52 may also download data to portal 72 upon activation of a switch by an operator onboard aircraft 54. Portal 72 may also upload data to microserver 52. For example, portal 72 may upload technical manuals to microserver 52 for access by maintenance personnel. Portal 72 may be provided with a number of software tools that analyze, organize and sort the data from microserver 52. Different portions of the data may then be made available to different users.

An advantage of portal 72 is that its functionality may be carried out in a secure, user friendly, web-based environment. Portal 72 functions as a central server that limits access to specified users. For example, those users may log in to portal 72 by presenting an identification and/or a password. Multiple users may access portal 72 simultaneously. For example, in FIG. 4, computing devices 74 and 76, as well as cell phone 78, are shown as having wireless communication with portal 72. Alternatively, these devices could have a wired connection to portal 72. A personal digital assistant (PDA), as well as other types of computing devices, may similarly be used to access portal 72. Alternatively, computing devices, operated by multiple users, may access data from microserver 52 directly through global Internet 70. As shown in FIG. 4, computer 80 and cell phone 82 may connect to global Internet 70 in order to access microserver 52.

Although it is not the focus of the present invention, onboard microserver 52, and resulting wireless system 58, may be used for coordinating aircraft maintenance, employee training, supply chain, and much more. For example, if a remote user, such as a supplier, needs to access data for an engine of aircraft 54, the user can access operating data by simply logging onto the web page for microserver 52, and more specifically to the web page for the server of that engine, if applicable. For security purposes, microserver 52 may be provided with a firewall and security protocols known only to selected individuals.

A vehicle based threat detection system may easily be implemented into network system 50. Sensors 64, which may include any type of WMD sensor described above, may be wirelessly connected to microserver 52. Microserver 52 may include software capable of communicating with sensors 64 and converting data from sensors 64 into useful information in terms of a potential threat. If a potential threat is identified, users onsite or at remote locations could run additional tests through microserver 52 to determine if a threat is real or if it is a false alarm. Alternatively, sensors 64 may be connected to a detection unit (not shown), such as a digital read out unit (as described above) that analyzes whether a threat is detected. The detection unit may be connected to microserver 52 and thus communicate the results of its analysis of signals from sensors 64 to microserver 52. As shown in FIG. 4, microserver 52 may also be connected to one or more cameras 62, which may be mounted in the cargo bay area of aircraft 54 to visually monitor cargo loading.

Through network system 50, notice of a potential threat can be communicated over the Internet to virtually any location. If a potential threat is detected by sensors 64, microserver 52 could automatically send out a low-bandwidth communication (i.e. e-mail, text message, etc.) to a specified list of locations, both onboard aircraft 54 through computing devices 68 and to remote locations through global Internet 70. Recipients of such a communication may include, but are not limited to, pilots of aircraft 54 and any additional flight crew, air traffic control units, and a government agency responsible for dealing with terrorist threats.

Network system 50 also has a capability to prevent aircraft 54 from leaving if a potential threat has been detected. Network 50 may be configured such that aircraft 54 is prohibited or disabled from taking off until additional tests are run or further inspections are conducted, and a follow-up communication is sent that the potential threat has been eliminated. As discussed above, microserver 52 makes it possible for multiple users at remote locations to access data from microserver 52. If a threat is detected, a remote monitoring user may log into microserver 52 to view the raw sensor data, run additional tests, view footage from camera 62, in order to confirm or invalidate the detected threat.

In the event that aircraft 54 were taken over by terrorists and control of aircraft 54 compromised, network system 50 could be configured to ground aircraft 54 if a threat is detected. If a potential weapon was detected after aircraft 54 had already taken off, data transmitted over network 50 may be valuable in determining more specifically what was detected. By identifying the type of weapon detected (for example, a weapon containing plutonium), it may be easier to determine where the weapon originated, and determine the possible identity of the controllers of the weapon.

As shown in FIG. 4, network system 50 includes RFID 66 which may include radio frequency identification units connected (wired or wirelessly) to microserver 52. RFID 66 may be used, for example, for tracking aircraft parts, passenger luggage, and cargo containers. Radio frequency identification readers may be used to scan cargo containers and luggage as they are being loaded onto aircraft 54; thus, the radio frequency identification readers are able to log each item as it is boarded on and off aircraft 54. A radio frequency tag on each item helps to track an origination for the item and/or an owner of the item.

RFID 66 may be used in conjunction with sensors 64 to help identify whether a detected weapon is a potential threat or a false alarm. For example, if a weapon is detected in a particular piece of cargo, RFID 66 may be used to identify where the cargo originated from. If it is found that the cargo originated from a suspected terrorist environment, then network system 50 may communicate to the appropriate parties that further investigation should be conducted before aircraft 54 is permitted to take off.

The vehicle-based threat detection system of the present invention allows for early detection of a weapon. By providing early detection of a potential weapon, including an indication of the type of weapon detected, the vehicle-based threat detection system described herein allows time for countermeasures to be taken to prevent or minimize the deployment of the detected weapon. Countermeasures, in the context of an aircraft, may include, but are not limited to, preventing the aircraft from taking off, preventing the aircraft from entering a particular air space, suppressing detonation or dispersal of a weapon, and jamming communication signals that might be used to detonate or disperse a weapon.

As discussed above in reference to FIG. 2, the threat detection system of the present invention may also include onboard electronic equipment, including an antennae system directed toward the cargo area and/or doorways, and capable of detecting operating electronic devices in cargo packages. A weapon with an electronic timer, pressure-activated detonator, or a communication device may be detectable by an electromagnetic sensor that detects electromagnetic signals radiating from within the device. It is recognized that various types of microprocessors, such as computers, also emit detectable electromagnetic signals. It may be valuable to include these types of electromagnetic sensors in a threat detection system in order to detect electronics that may be used to detonate or disperse a weapon.

Cost estimates for implementing a vehicle-based threat detection system on cargo aircraft are a small fraction of the cost estimates for installing ground-based equipment for explosive detection sensors (EDS) to screen air cargo at major airports. The differential costs of implementing a vehicle-based threat detection system are further reduced if the WMD sensors are implemented into a microserver system like that described above in reference to FIG. 4, provided that the microserver system is to be installed for various other purposes. A microserver system as described above allows for reduction of an aircraft's operational costs by providing an onboard host of maintenance data and information for various users, including flight crew and mechanics. Through a microserver system, users are able to access data directly from a product and back to its supply chain. Moreover, other applications, like WMD sensors as described above, may be easily added to the microserver system, as shown in FIG. 4, to enable new functions of the microserver at a minimal expense.

The present invention of a vehicle-based threat detection system focuses on the ability to detect a potential threat of a WMD as early in time as possible and as far away as possible from its intended detonation or dispersal location. The further away you are able to sense a potential threat, the more time there is to react to it and prevent it from getting close to highly populated areas. Unfortunately, in some cases, a ground-based screening system that scans cargo after it reaches its destination may be too late. In fact, such a ground-based system is obsolete if the weapon is dispersed or detonated before reaching the destination of the aircraft. Yet, on the other hand, a ground-based screening system that scans cargo before it boards an aircraft may be susceptible to tampering and local influence, particularly in hostile environments. In either event, a ground-based screening system may likely never be implemented in the air travel industry given the enormous development and installation costs. The present invention provides a safer, more desirable alternative for screening air cargo at a fraction of the cost. In addition to air cargo, the present invention may also be used for any type of vehicle, including marine and land vehicles.

Although the present invention has been described with reference to preferred embodiments, workers skilled in the art will recognize that changes may be made in form and detail without departing from the spirit and scope of the invention.

The invention claimed is:

1. A vehicle-based threat detection system for detecting a weapon of mass destruction (WMD) in a vehicle, the threat detection system comprising:
   at least one WMD sensor mounted to the vehicle in a cargo holding area of the vehicle wherein the at least one WMD sensor includes a radiation sensor for sensing gamma rays, neutrons, or both;
   at least one WMD detector connected to the at least one WMD sensor to detect presence and type of a weapon of mass destruction in the cargo holding area; and
   a warning system capable of communicating detection of a weapon of mass destruction and an indication of a type of WMD detected to personnel on board the vehicle at a location remote from the cargo holding area and to recipients located remote from the vehicle.

2. The threat detection system of claim 1, wherein the at least one WMD sensor includes a sensor mounted within the vehicle at a location adjacent to an entrance to the cargo holding area for screening cargo being loaded into the cargo holding area.

3. The threat detection system of claim 1, wherein the at least one WMD sensor further includes at least one of: a chemical sensor that samples surrounding air for detecting chemical agents, and a biological sensor that samples surrounding air for detecting biological agents.

4. The threat detection system of claim 1, wherein the radiation sensor includes at least one of a gamma ray detector and a neutron counter.

5. The threat detection system of claim 1, wherein the at least one WMD sensor includes at least one of: sensors capable of detecting a dirty bomb containing an explosive and radioactive material, and electromagnetic sensors to detect electromagnetic signals from electronic devices located inside cargo and capable of triggering an explosion or dispersal of a weapon.

6. The threat detection system of claim 1 further comprising a radio frequency identification reader for providing an identification of a cargo item causing a detection of a weapon.

7. The threat detection system of claim 1, wherein the vehicle is one of an aircraft, a marine vehicle, and a land vehicle.

8. The threat detection system of claim 1, wherein the vehicle is an aircraft and the warning system communicates detection of a weapon of mass destruction to at least one of: a cockpit of the aircraft and a government agency responsible for dealing with terrorist threats.

9. The threat detection system of claim 1, wherein the warning system includes a vehicle-based computer network that creates a wireless system around the vehicle and has a web page dedicated to the vehicle.

10. A method of detecting a weapon of mass destruction WMD inside a vehicle, the method comprising:
    sensing parameters indicative of presence of a weapon of mass destruction inside the vehicle using at least one WMD sensor mounted inside the vehicle, wherein the at least one WMD sensor is configured to detect nuclear weapons and radiological weapons;
    detecting presence of a weapon of mass destruction inside the vehicle based upon parameters sensed by the at least one WMD sensor; and
    communicating detection of a weapon of mass destruction inside the vehicle to a recipient on board the vehicle and to a recipient, responsible for dealing with terrorist threats, at a location remote from an area in which the detected weapon of mass destruction is located.

11. The method of claim 10 further comprising at least one of:
    inhibiting operation of the vehicle if a weapon of mass destruction is detected; and
    responding to detection of a weapon of mass destruction with countermeasures designed to eliminate or minimize an intended impact of the weapon of mass destruction.

12. The method of claim 11, wherein countermeasures include at least one of: suppressing detonation or dispersal of a weapon of mass destruction, jamming a signal capable of detonating or dispersing a weapon of mass destruction, and preventing the vehicle from entering a populated area.

13. The method of claim 10 further comprising:
    detecting any tampering with the at least one WMD sensor; and
    communicating a detection of tampering to a location remote from the at least one WMD sensor.

14. The method of claim 10 further comprising:
    analyzing data from the at least one WMD sensor and performing additional tests to confirm or invalidate whether an actual weapon of mass destruction was detected.

15. The method of claim 10, wherein communicating detection of a weapon of mass destruction is performed by a network system within the vehicle that hosts a web page and allows wireless communication between the vehicle and a remote location.

16. A vehicle-based threat detection system for detecting a weapon of mass destruction (WMD) on an aircraft, the threat detection system comprising:
    at least one WMD sensor mounted within and transportable with the aircraft for sensing gamma rays, neutrons, or both;
    a WMD detector inside the aircraft for detecting presence of a weapon of mass destruction inside the aircraft based upon signals from the at least one WMD sensor; and a network inside and around the aircraft for communicating presence of a detected weapon of mass destruction to a cockpit area of the aircraft and to a recipient remote from the aircraft that is responsible for dealing with terrorist threats.

17. The threat detection system of claim 16, wherein the at least one WMD sensor includes at least one of: a radiation sensor mounted within the aircraft and located around an opening of a door for sensing entrance of a weapon of mass destruction onto the aircraft.

18. The threat detection system of claim 16, wherein the at least one WMD sensor further includes sensors capable of sensing a dirty bomb.

19. The threat detection system of claim 16, wherein the at least one WMD sensor includes sensors located in at least one of: a cargo holding area of the aircraft, a landing gear bay, a maintenance panel, and a luggage compartment.

20. The threat detection system of claim 16, wherein the network includes a microserver that hosts a web page and generates a wireless system around the aircraft.

21. A vehicle-based threat detection system for detecting a weapon of mass destruction (WMD) in a cargo holding area of a vehicle, the threat detection system comprising:
 one or more vehicle-mounted WMD sensors mounted within the vehicle in or near a cargo holding area of the vehicle, wherein the WMD sensors are configured to detect at least one of: neutrons, gamma rays, nuclear weapons, radiological weapons, and combinations thereof; and
 at least one WMD detector in the vehicle for detecting presence of a weapon in the cargo holding area based upon signals from the WMD sensors.

22. The threat detection system of claim 21, wherein at least one of the WMD sensors is mounted above an entrance to the cargo holding area for screening cargo being loaded into the cargo holding area.

23. The threat detection system of claim 21, wherein the WMD sensors further include a sensor configured to detect at least one of chemical weapons, biological weapons, and explosives.

24. The threat detection system of claim 21 further comprising:
 a warning system capable of communicating detection of a weapon of mass destruction to personnel on board the vehicle and to a recipient at a location remote from the vehicle that is responsible for dealing with terrorist threats.

* * * * *